W. R. BLYSTONE.
VEHICLE SUSPENSION.
APPLICATION FILED SEPT. 30, 1912.
1,052,648.
Patented Feb. 11, 1913.
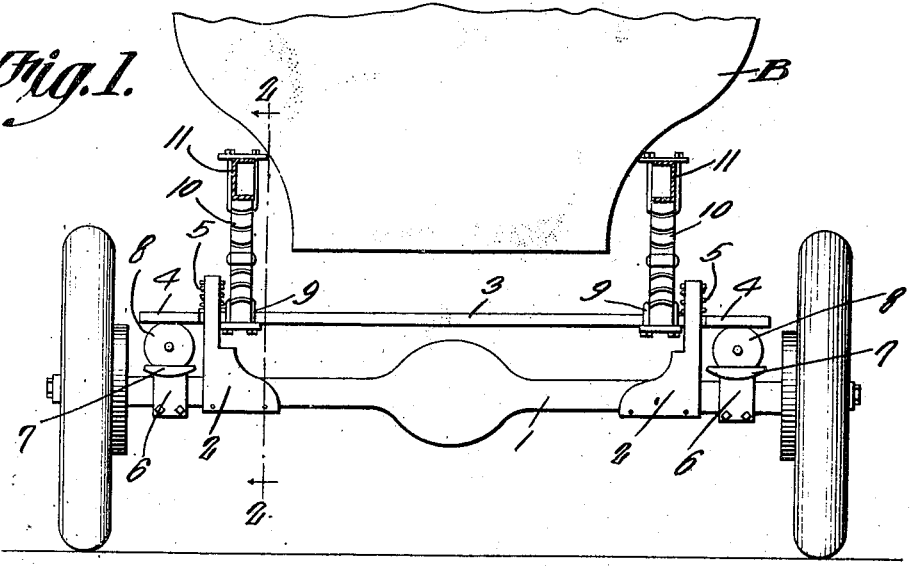
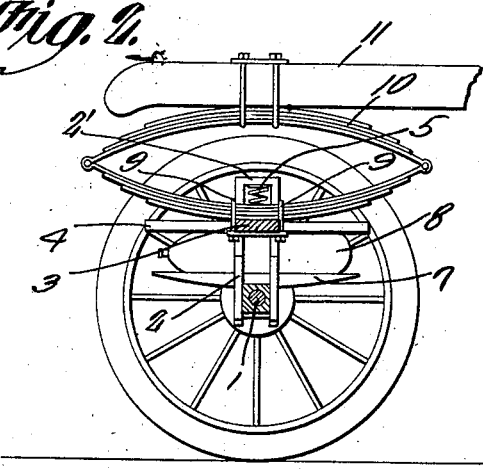
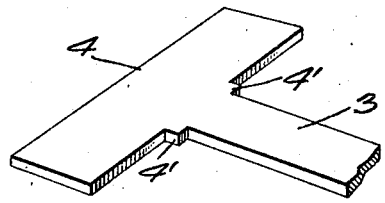
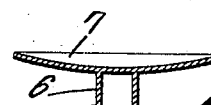
Witnesses
W. R. Blystone
Inventor
by
Attorneys

UNITED STATES PATENT OFFICE.

WILLIAM R. BLYSTONE, OF GREENSBURG, PENNSYLVANIA.

VEHICLE SUSPENSION.

1,052,648.   Specification of Letters Patent.   Patented Feb. 11, 1913.

Application filed September 30, 1912. Serial No. 723,172.

*To all whom it may concern:*

Be it known that I, WILLIAM R. BLYSTONE, a citizen of the United States, residing at Greensburg, in the county of Westmoreland and State of Pennsylvania, have invented a new and useful Vehicle Suspension, of which the following is a specification.

The present invention relates to improvements in vehicle suspensions, the primary object of the present invention being the provision of a novel form of resilient suspension device for vehicles, the main compressive action of which is taken care of through a pneumatic device, while the rebound action is taken care of by means of a spring, both coacting to maintain the body in resilient relation to the axles of the vehicle and in such a manner as to relieve sudden jolts or jars by absorbing the shock thereof with the greatest facility.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the drawings—Figure 1 is a rear elevation of a vehicle and rear axle with the present suspension device in operable relation thereto. Fig. 2 is a section taken on line 2—2 of Fig. 1. Fig. 3 is a perspective view of one terminal of the intermediate resiliently supporting bar. Fig. 4 is a detail sectional view through the pneumatic cushion carrying lower member.

Referring to the drawings, the numeral 1 designates the axle of the vehicle which has disposed thereupon, near the opposite ends thereof, the upstanding supports 2, which constitute in reality an open frame closed at the top by means of the bar 2'. A movable transversely disposed bar 3 is mounted so that the cross bars 4 formed upon the terminals thereof are exteriorly of the supporting plate 2 while the intermediate portion adjacent to such cross heads 4 are slidably mounted between and within the frames 2. This bar 3 is the intermediate medium which resiliently supports the body B, the two springs 5 being mounted between the cross pieces 2' of the frames 2 and above the bar 3 at its connection with the cross heads 4, said springs 5 acting to resiliently cushion the rebound of the bar 3 due to the upward thrust of the body B as is often occasioned by the roughness of the road surface.

Secured to the axle 1 exterior of the respective supports 2 are the two clamps 6, each one of which carries the elongated plate 7, which provides a receptacle for the elongated pneumatic cushion 8, said cushion 8 being disposed to rest therein, as clearly shown in Figs. 1 and 2 and about the under surface of the respective cross heads 4, the pneumatic cushions 8 acting in opposition to the springs 5 or to be compressed due to the weight of the body through the elliptical springs 10 upon the bar or plate 3.

The clamps 9 retain the elliptical springs 10 relatively to the respective ends of the bar 3 within the support 2, while the adjacent portion of the elliptical springs 10 are connected to the frame or chassis 11 of the vehicle.

Under ordinary conditions, it will be seen that the weight is carried mainly upon the elliptical springs 10, the bar 3 being properly supported and yet resiliently supported by means of the pneumatic cushions 8 and the rebound springs 5, but as soon as any undue strain is thrown upon the axle due to the roughness of the road, which would either tend to cause the body to be moved upwardly or downwardly, that the pneumatic cushions 8 are placed under compression to absorb the downward shock, while the rebound springs 5 will be compressed upwardly to absorb the upward shock.

The shouldered portions 4' limit the inner lateral movement of the bar 3, while the clamps 9 limit the outward movement.

From the foregoing description, taken in connection with the drawings it is evident that with a suspension device constructed according to and embodying the present invention, that a combined suspension and shock absorber is provided which will produce an easy riding vehicle, and retain all of the excellent qualities of a pneumatic suspension due to the positioning of the pneumatic cushions 8 at the extreme ends of the resiliently supported bar 3.

What is claimed is:

1. In a vehicle suspension, the combination with a chassis and an axle, of a pair of supports connected to the axle and carrying an open frame, a bar provided with a cross head upon each end disposed for sliding movement within both frames with the cross heads beyond the frames, springs connected to the bar within the frames and to the chassis, a rebound cushion carried by each open frame disposed upon the upper face of the bar, and a compression cushion carried by the axle and disposed in engagement with the respective cross heads of the bar.

2. In a vehicle suspension, the combination with a chassis and an axle, of a pair of supports connected to the axle and carrying an open frame, a bar provided with a cross head upon each end disposed for vertical sliding movement within both frames with the cross heads beyond the frames, springs connected to the bar within the frames and to the chassis, a spring mounted within each open frame above and in contact with an adjacent portion of the bar for absorbing the rebound shock, and a compression cushion mounted between the axle and each cross head of the bar for absorbing the compression between the vehicle body and axle.

3. In a vehicle suspension, the combination with a chassis and an axle, of a pair of supports connected to the axle and carrying an open frame, a bar provided with a cross head upon each end disposed for sliding movement within both frames with the cross heads beyond the frames, springs connected to the bar within the frames and to the chassis, a spring mounted within each open frame above and in contact with the adjacent portion of the bar, for absorbing the rebound shock of the bar, a compression cushion mounted between the axle and each cross head of the bar for absorbing the compression between the vehicle body and axle, said last cushioning means each comprising a clamp secured to the axle, and the elongated cup members carried by the clamp, and a pneumatic cushion mounted in said cup-shaped member and disposed to be carried between its respective cross head of the bar and said clamp.

In testimony that I claim the foregoing as my own, I have hereto affixed my signature in the presence of two witnesses.

WILLIAM R. BLYSTONE.

Witnesses:
  E. S. NALY,
  D. E. DUNMIRE.